United States Patent Office 3,474,623
Patented Oct. 28, 1969

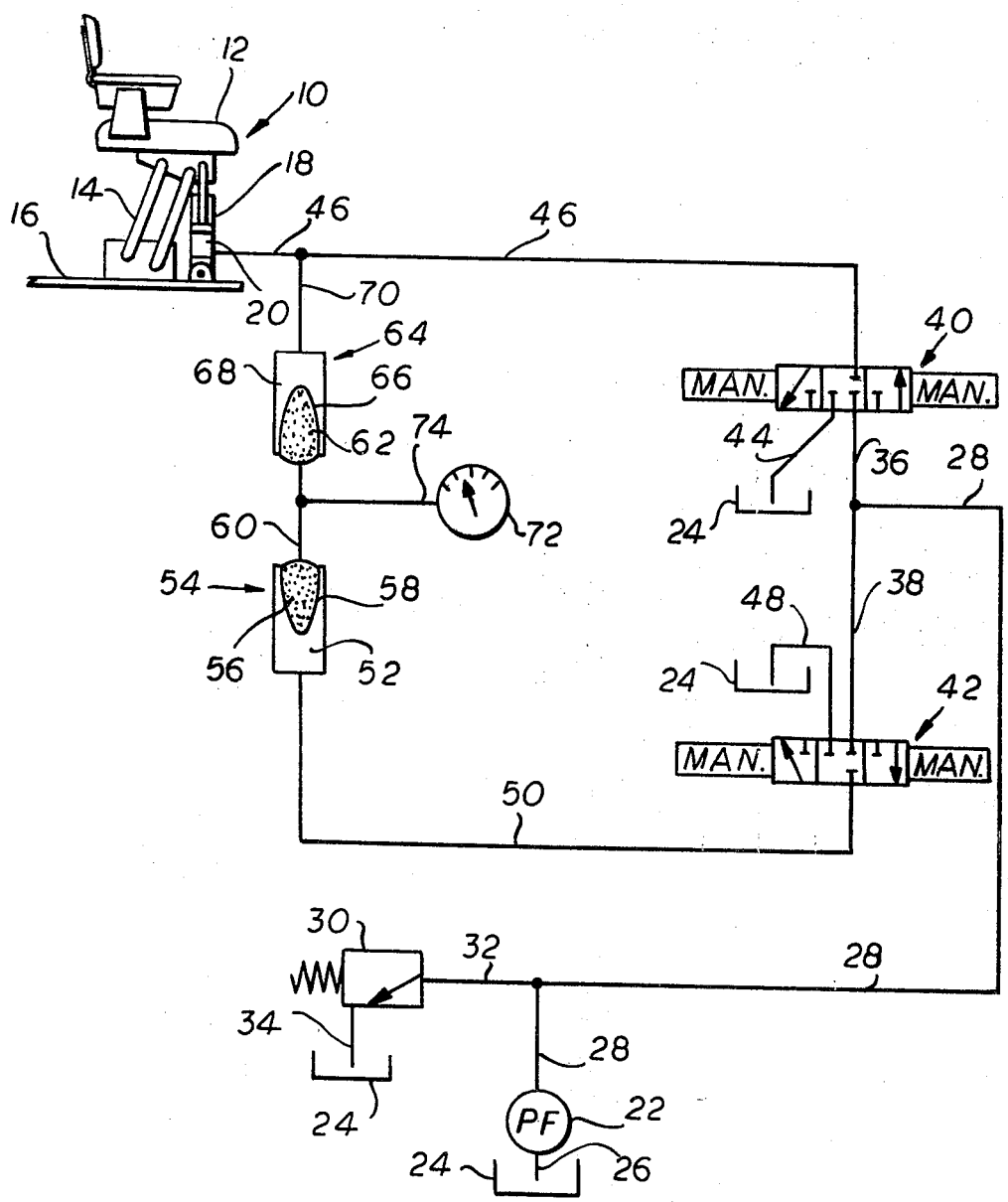

3,474,623
HYDRAULIC SEAT SUSPENSION
Robert D. Barrett, Westchester, Joseph F. Ziskal, Downers Grove, and Jerry E. Morgan, Clarendon Hills, Ill., assignors to International Harvester Company, Chicago, Ill., a corporation of Delaware
Filed Jan. 24, 1967, Ser. No. 611,462
Int. Cl. F15b 1/02, 13/04
U.S. Cl. 60—51      4 Claims

ABSTRACT OF THE DISCLOSURE

A hydraulic seat suspension having a first accumulator with its hydraulic fluid chamber connected to the working end of a hydraulic ram forming a part of the seat suspension linkage, a second accumulator with its gas chamber connected to the gas chamber of the first accumulator, and a directional control valve for selectively directing fluid from a pump to the oil chamber of the second accumulator for varying the spring rate of the suspension system.

BACKGROUND OF THE INVENTION

The present invention relates to supports generally and more particularly to support stands having a surface supported resiliently by a fluid spring.

Many attempts have been made in the past to provide a support for a seat which would permit an individual operator to select a desired height for the seat as well as to permit a selection of the spring rate, i.e. the degree of "softness" or "hardness," desired. Most of the prior art suspensions which attempted to offer such provision incorporated interdependent means therefor, so that changing the vertical height or elevation also resulted in a change in spring rate and vice versa. Where the prior art did teach separate controls for both spring rate and elevation, one or the other of these controls was so difficult of adjustment that changes therein were cumbersome or often impossible.

SUMMARY

The present invention provides a seat suspension which obviates the objections and deficiencies of the prior art and permits an operator to independently change either or both the height of the seat and the spring rate of the suspension system, and is arranged in such a manner as to allow these changes to be accomplished with a minimum of effort while seated and with the vehicle in motion.

It is, therefore, an object of the present invention to provide a hydraulic seat suspension which permits the spring rate and the vertical height of the seat to be easily changed, and which permits such changes to be made conveniently from a seated position while the vehicle equipped therewith is in motion.

It is also an object of the present invention to provide a hydraulic seat suspension with means for independently adjusting the seat height and the spring rate, and to provide such a means in closed system which will be simple and inexpensive to manufacture, which will be unaffected by climatic conditions, and which will require little maintenance.

These and other objects and many of the attendant advantages of the present invention will become more readily apparent upon a perusal of the following description and the accompanying drawing.

BRIEF DESCRIPTION OF THE DRAWING

The sole figure is a schematic representation, utilizing JIC standard graphical symbols, of a seat suspension incorporating features of the present invention.

DESCRIPTION OF THE PREFERRED EMBODIMENT

Referring to the drawing, there is shown a hydraulically suspended seat assembly, indicated generally at 10, which comprises a seat 12 supported by a linkage 14 from a base member 16 carried by a vehicle, not illustrated. A single acting hydraulic cylinder or motor 18 having a working chamber 20 is connected between the base member 16 and the seat 12 so that vertical oscillations of the seat 12 with respect to the base member 16 cause a variation in the volume of the chamber 20.

A pump 22 draws hydraulic fluid from a reservoir 24 through a conduit 26 and delivers it under pressure to a conduit 28. A pressure relief valve 30 returns excess fluid to the reservoir 24 through conduits 32 and 34. The pressure conduit 28 branches into conduits 36 and 38 which lead to and communicate with a pair of valves respectively designated as the height control valve 40 and the spring rate valve 42. The height control valve 40 has a port communicating with the reservoir 24 by means of a conduit 44 and another port in communication with the working chamber 20 by means of a conduit 46. The valve 40 is a three position, manually actuated valve having a central neutral position in which all three conduits leading thereto are blocked, a raise position, i.e. that position illustrated by the right-hand portion of the schematic representation shown in the drawing, in which the conduit 44 is blocked and the conduit 46 and 36 are in communication, and a lower position, i.e. the left portion, in which the pressure conduit 36 is blocked and the conduits 44 and 46 are in communication. The spring rate valve 42 has two conduits 48 and 50 in communication therewith and leading respectively to the reservoir 24 and the hydraulic fluid chamber 52 of an accumulator 54. This valve 42 is also of the three position, manually actuated type with a central neutral position in which all three conduits 38, 48 and 50 are blocked, an increase position, i.e. the right portion of the graphically represented valve, in which the conduit 48 is blocked and the conduits 38 and 50 are connected, and a decrease position, i.e. the left portion, in which the conduit 38 is blocked and the conduits 48 and 50 connected. The accumulator 54 has a compressible fluid or gas chamber 56 which is separated from the hydraulic fluid chamber 52 by a movable member or piston 58. A conduit 60 connects the gas chamber 56 of the first accumulator 54 to the gas chamber 62 of a second accumulator 64, which has a movable member or piston 66 separating the gas chamber 62 from a hydraulic fluid chamber 68. A line or conduit 70 places the fluid chamber 68 of the second accumulator in communication with the conduit 46. A pressure gage 72, which may be calibrated in terms other than pounds per square inch to indicate optimum spring rate for a given operator weight, is connected to the conduit 60 by means of a line 74.

With both valves 40 and 42 in their center neutral positions, the conduits 50 and 46 are blocked and the volume of hydraulic fluid within the chambers 20, 52 and 68 and the conduits 46, 50 and 70 is a fixed amount. As the seat 12 is depressed relative to the base member 16, hydraulic fluid will be forced from the working chamber 20, through the conduit 46 and 70 to the chamber 68 of the second accumulator 64. This fluid will force the pisten 66 down, as viewed in the drawing, decreasing the volume available for the gas in chambers 56 and 62, and hence increasing the pressure of the gas. This increased pressure urges the seat 12 back to the position it originally occupied with the operator seated thereon. When a change in the elevation or height of the seat is desired, the height control valve 40 is moved from its center position. To lower the seat, the valve 40 is moved to its lower position connecting the conduit 46 to the reservoir 24 through the conduit 44 which permits fluid to be pushed out of the working chamber 20, thereby permitting the cylinder 18 to collapse. Since the weight supported by the gas, as well as the volume available for the gas to occupy, remains the same, the pressure within the gas chambers 62 and 56 will not be affected, and the spring rate, therefore, is unchanged. No consideration will be given herein to those conditions wherein the hydraulic motor or cylinder is at the extreme limit of its travel, in either direction, because it is not desirable to operate the seat under such conditions. That is, when the cylinder is fully collapsed there can be no springing action whatever, and when the cylinder is fully extended, downward movement of the seat relative to the base member 16 is resiliently resisted, but rebound or upward movement is abruptly halted. Thus, it will be assumed that the hydraulic cylinder 18 will always be at some intermediate state of collapse under static conditions with an operator seated thereon. In order to elevate the seat, the control valve 40 is moved to its raised position connecting the conduit 46 with the conduits 36 and 28 which permits hydraulic fluid under pressure to be delivered from the pump 22 to the working chamber 20 of the cylinder 18. The addition of fluid to the chamber 20 extends the cylinder 18 and raises the seat, but does not affect the pressure of the compressible fluid or gas. Thus, the seat will be raised while the spring rate remains the same.

Changes in the spring rate are effected by moving the spring rate valve 42 from its central neutral position. To increase the rate, i.e. make the suspension "stiffer," the valve 42 is moved to its increase position which connects the conduit 38 with the conduit 50, thereby directing hydraulic fluid under pressure from the pump 22 through the conduits 28, 38 and 50 to the hydraulic fluid chamber 52 of the accumulator 54. If the piston member 66 of the second accumulator 64 is capable of moving upward, i.e. capable of increasing the volume available for the gas within the chamber 62, the addition of hydraulic fluid to the chamber 52 initially will not change the spring rate but will merely result in transfer of compressible fluid or gas from the chamber 56 to the chamber 62. This will force the hydraulic fluid from the chamber 68, and since the valve 40 is in its center neutral position, the working chamber 20 is the only receptacle capable of receiving the expelled fluid. Thus the cylinder 18 will be extended raising the height of the seat 12. However, when the piston member 66 is fully retracted, i.e. when the gas chamber 62 can no longer increase its volume, the addition of more hydraulic fluid to the chamber 52 will result in an increase in the gas pressure in both of the chambers 56 and 62. Under such initial conditions wherein the gas chamber 62 is capable of expanding with the operator seated on the seat 12, it may be necessary for the operator to readjust the elevation of the seat with the height control valve 40 after adjustment of the spring rate. If on the other hand with the operator seated, the gas chamber 62 is at its maximum volume, the rate valve 42 can be moved to its increase position and the spring rate increased without affecting the elevation of the seat 12. To decrease the spring rate, i.e. make the suspension "softer," the rate valve 42 is moved to its decrease position which connects the conduit 50 to the reservoir through the conduit 48. This permits hydraulic fluid to be expelled from the chamber 52 and makes the volume available for the gas within both chambers 62 and 56 larger. Thus the pressure of the compressible fluid or gas is decreased and the spring rate is also thereby decreased.

The above stated procedure does provide a change in the spring rate, but presents still another problem, viz cavitation occurring when the seat moves upward extending the cylinder. In order to prevent undesirable cavitation, it will be necessary to insure the presence of hydraulic fluid in the chamber 68 of the second accumulator. This is accomplished by providing a portion of the final pressure by means of the valve 42 and the remaining portion by the valve 40. The procedure to be followed by an operator, after assuming a position upon the seat 12, is to move the height control valve 40 to its lower position. The weight of the operator, in addition to the weight of the seat and linkage elements, will collapse the cylinder 18 forcing hydraulic fluid from the working chamber 20. The compressible fluid within the chamber 62 will expand forcing all hydraulic fluid from the chamber 68. The valve 40 is then returned to center neutral position and the spring rate valve 42 is moved to its increase position and, observing the gage 72, hydraulic fluid is admitted into the chamber 52 compressing the fluid in both chambers 56 and 62 until the gage 72 indicates a pressure approximately one-half the final pressure, i.e. that pressure which will initiate extension of the cylinder 18. The spring rate valve is then moved to its center neutral position. The height control valve 40 is then moved to its raise position, and since the pressure of the compressible fluid is less than that required to support the operator, the hydraulic fluid under pressure admitted to the conduit 46 will enter the chamber 68 through the conduit 70. The piston 66 will be forced downward, as viewed in the drawing, raising the pressure of the compressible fluid. When a pressure sufficient to support the weight of the operator is reached, movement of the piston 66 will cease and any additional fluid admitted through the valve 40 will be utilized to extend the cylinder 18. The height control valve is then moved to its center neutral position when the desired seat elevation has been attained. It will be noted that this particular procedure permits only one static pressure for a given weight operator. However, the spring rate is partially determined by the elastomeric members 66 and 58 and not by the static pressure alone. Hence, the amount of hydraulic fluid in the chamber 68 does aid in determining the condition of the member 66, and the volume of chamber 68 is in turn determined by the volume of chamber 52. This is the pre-charge and, by proper design, optimum ride characteristics can be provided for the operator regardless of his weight. That is, different operators can occupy the seat and for each operator, after following the latter-mentioned procedure, spring rate curve will be provided which is ideal for that weight of operator.

It will be appreciated, therefore, that the present invention does provide independent adjustment of both seat height and spring rate, within a practical range, and accomplishes these adjustments in a manner which permits rapid and convenient changes by the operator while seated. In addition, by utilizing commercially available components and incorporating the suspension medium, i.e. the compressible fluid, into a closed system, the present invention can be easily and economically constructed and maintained; maintenance being enhanced by utilizing an inert gas for the compressible fluid and thereby avoiding the use of atmospheric gases, which are corrosive and which have compressibility characteristics dependent upon climatic conditions.

What is claimed is:

1. In a hydraulic seat suspension for a vehicle having a source of incompressible hydraulic fluid under pressure, including a seat assembly mounted for vertical movement and a hydraulic motor responsive to such movement, the improvement comprising:

and accumulator means having a pair of movable members therein defining a central chamber therebetween capable of holding a compressible fluid under pressure;

the central chamber separating outer chambers capable of receiving hydraulic fluid;

conduit means connecting said motor to one of said outer members;

first valve means having a first position for directing hydraulic fluid from said source to said other chamber, a second position for preventing hydraulic fluid ingress to and egress from said other chamber, and a third position for permitting the exhaust of hydraulic fluid from said other chamber, whereby the static pressure of said compressible fluid may be varied to provide different spring rates for the seat assembly; and second valve means for selectively directing hydraulic fluid from said source to and exhausting hydraulic fluid from the hydraulic motor whereby static elevation of the seat assembly may be varied.

2. In a hydraulic seat suspension according to claim 1, wherein said first valve means comprises;

a single three position valve.

3. In a hydraulic seat suspension according to claim 1, wherein said accumulator means comprises;

a pair of accumulators, each of said accumulators having a movable member separating a gas chamber from a hydraulic fluid chamber, said accumulators being connected with their gas chambers in communication to form said central chamber and the hydraulic fluid chambers from said outer chambers.

4. In a hydraulic seat suspension according to claim 1 and further comprising;

a pressure gage in communication with said central chamber to provide an indication of the static pressure of said compressible fluid, whereby the spring rate may be determined with the seat assembly occupied and at rest.

References Cited

UNITED STATES PATENTS

| | | |
|---|---|---|
| 2,760,552 | 8/1956 | Decker. |
| 2,923,344 | 2/1960 | Voie. |
| 2,955,897 | 10/1960 | Noe _____ 60—51 |
| 3,227,435 | 1/1966 | Greer _____ 267—64 |
| 3,266,792 | 8/1966 | Sherrill. |
| 3,306,599 | 2/1967 | Allinquant. |
| 3,323,810 | 6/1967 | Klein _____ 267—64 |
| 3,366,378 | 1/1968 | Sons _____ 267—64 |
| 2,620,182 | 12/1952 | Marston et al. _____ 267—64 |
| 3,033,552 | 5/1962 | Ogden. |

FOREIGN PATENTS 1,183,383  12/1964  Germany.

MARTIN P. SCHWADRON, Primary Examiner

IRWIN C. COHEN, Assistant Examiner

U.S. Cl. X.R.

60—52; 267—64; 297—330